United States Patent [19]

Van Dijk

[11] Patent Number: 4,905,250
[45] Date of Patent: Feb. 27, 1990

[54] PRE-IONIZING ELECTRODE ARRANGEMENT FOR A GAS DISCHARGE LASER

[75] Inventor: Johannes W. Van Dijk, North Ferriby, Great Britain

[73] Assignee: The European Atomic Energy Community, Plateau du Kirchberg, Luxembourg

[21] Appl. No.: 120,153

[22] Filed: Nov. 13, 1987

[51] Int. Cl.⁴ ............................................. H01S 3/097
[52] U.S. Cl. ........................................ 372/86; 372/61; 372/87
[58] Field of Search ....................... 372/61, 81, 82, 86, 372/87, 83, 85

[56] References Cited

U.S. PATENT DOCUMENTS

| | | | |
|---|---|---|---|
| 3,781,712 | 12/1973 | Judd | 372/86 |
| 3,886,479 | 5/1975 | Pearson | 372/86 |
| 4,071,806 | 1/1978 | List | 372/86 |
| 4,088,965 | 5/1978 | Lauderslager et al. | 372/86 |
| 4,387,463 | 6/1983 | Rickwood | 372/86 |
| 4,450,566 | 5/1984 | Marchetti et al. | 372/86 |
| 4,503,542 | 3/1985 | Cirkel et al. | 372/86 |
| 4,555,787 | 11/1985 | Cohn et al. | 372/86 |
| 4,556,981 | 12/1985 | Cirkel et al. | 372/86 |
| 4,601,039 | 7/1986 | Sze | 372/86 |
| 4,613,971 | 9/1986 | Brumme et al. | 372/86 |
| 4,677,638 | 6/1987 | Beaupere et al. | 372/87 |
| 4,709,373 | 11/1987 | Scott et al. | 372/86 |
| 4,748,635 | 5/1988 | McLellan | 372/86 |

FOREIGN PATENT DOCUMENTS

| | | | |
|---|---|---|---|
| 0048407 | 3/1982 | European Pat. Off. | 372/87 |
| 0267593 | 5/1988 | European Pat. Off. | 372/55 |

Primary Examiner—Frank Gonzalez
Attorney, Agent, or Firm—Bacon & Thomas

[57] ABSTRACT

The invention provides a gas-discharge laser comprising an array of pre-ionizing electrodes (PIP) operating by a sliding-spark discharge; there being an array provided on either side of each of the main electrodes (ME1, ME2) of the laser.

9 Claims, 3 Drawing Sheets

PRE-IONIZING ELECTRODE ARRANGEMENT FOR A GAS DISCHARGE LASER

BACKGROUND OF THE INVENTION

The present invention relates to a gas discharge laser.

It is known to use a pre-ionising electrode array in a gas-discharge laser to condition the gas to facilitate the discharge between the discharge electrodes or main electrodes of the laser. In particular, it is known to use a sliding spark array employing a linear series of pairs of electrode "pins" passing lengthwise along the discharge vessel of the laser and along which a spark passes progressively from one end of the series to the other, that is, from one pair of pins to the next in the series.

However, the arrangements of a sliding-spark array heretofore employed have not been as efficacious as could be wished for in promoting the discharge between the main electrodes and in preventing arcing of the main electrodes.

SUMMARY OF THE INVENTION

It is an object of the present invention to provide a gas-discharge laser having a more efficacious sliding-spark arrangement.

There is provided by the present invention a gas-discharge laser comprising an array of pre-ionising electrodes operating by a sliding-spark discharge, characterised in that, a plurality of sliding-spark pre-ionising electrode arrays (3,5,7, & 9) are employed namely at each lateral side of each main electrode (ME1 & ME2) to provide ionisation throughout the discharge volume between the main electrodes.

In each array, a first electrode in each pair of electrodes may be electrically connected with one of the main electrodes and the second electrode of each pair electrically connected with the other of the main electrodes.

The electical connection of the pre-ionising electrodes with the respective main electrode is preferably effected via a peaking capacitor except, optionally, the electrode of the last pair may be connected with the lower voltage main electrode.

The arrays employed in the present invention may be constituted as a unit so that on installation of the unit in the discharge chamber of the laser, each array is positioned in relation to the respective main electrode as required.

It is also preferred in the present invention that the electrode pairs on one side of a main electrode are offset by 50% with respect to those on the other side of the main electrode, and that, in each array, adjacent electrode pairs are separated by a distance of some two cm.

A further preference is that each array exceeds in length the length of the main electrodes, and that the distance of an array from the main electrode center line is minimised.

DESCRIPTION OF THE PREFERRED EMBODIMENT

Figure 1:
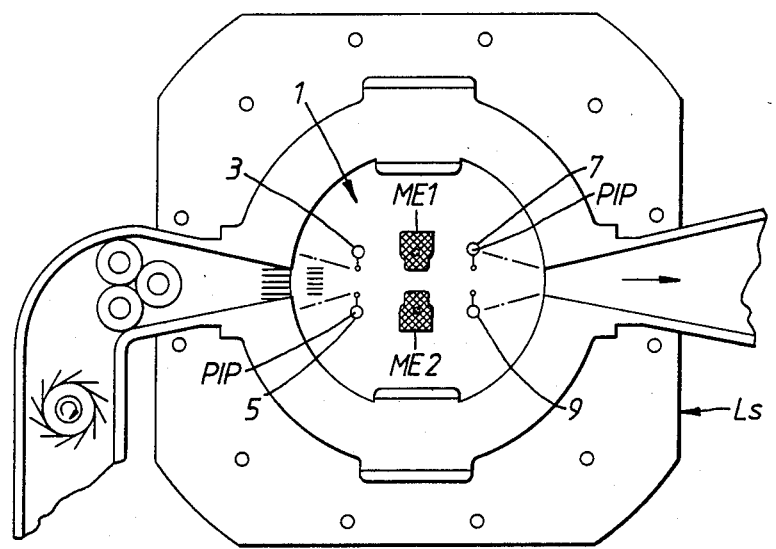
FIG. 1 is a cross-sectional view of the discharge chamber of a gas-discharge laser according to the present invention.

Referring to FIG. 1, the laser, generally indicated at Ls, comprises a discharge chamber 1 in which the main lasing volume between the main electrodes ME1, ME2 is preconditioned by four arrays (3,5,7,9) of pre-ionising, sliding spark electrode sets assembled as a unit, PIU (see especially FIG. 2) to create a weak conducting medium for the main discharge; there being a pair of arrays flanking each of the top and bottom main electrodes.

Figure 2:
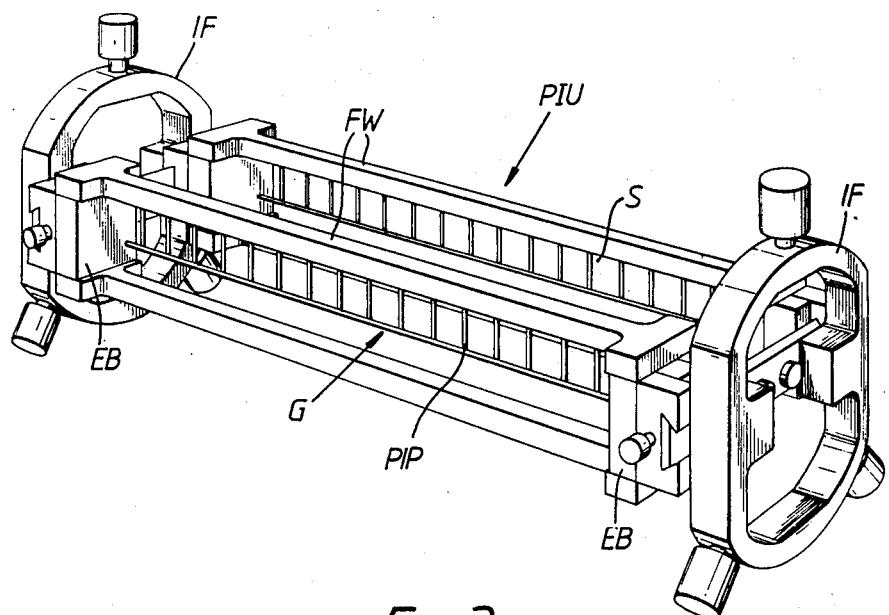
FIG. 2 is a perspective view of a pre-ionising electrode unit employed in the laser of FIG. 1, some of the pre-ionising electrodes having been omitted to simplify the drawing.

The arrays are made up as a unit and the unit PIU is shown in FIG. 2. For simplicity, the unit seen in FIG. 2 shows only two of the arrays (5,9) of pairs of pre-ionised pins PIP mounted on supporting frameworks FW dovetailed into end blocks EB carried by insulating end frames IF mounted, in use, in the discharge chamber. The assembly, for convenience, could be mounted directly on the main electrodes in a self-synchronizing mode. A design feature here was the ability to alter the P.I.-electrode distance and optimize the preconditioning of the main electrodes with U.V. photons and to avoid flashover (arcing) between the P.I. unit and main electrodes.

Figure 3:
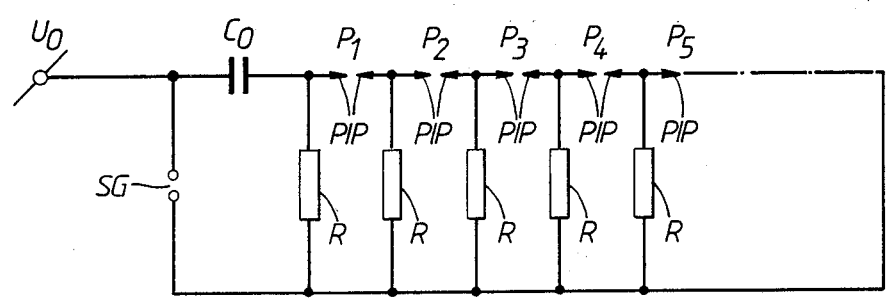
FIG. 3 is a diagrammatic representation of a set of the pre-ionising electrodes of the unit.

FIG. 3 is a simple sliding-spark diagram and shows an array of the pre-ionising pins PIP. The gap (P1 to Ps respectively) between opposed pins is $\simeq 0.5$ mm. to $\simeq 0.8$ mm. Initially, the storage capacitor Co is charged to a potential of 65 KV. After the spark-up SG is triggered by a trigger circuit (not shown) the voltage rises on the first pin of gap P1. The second pin of gap P1 is at a low potential and the gap breaks down. All pins are loaded with a resistor R, in this instance of 50K$\Omega$, to form a high impedance for the incremental surge current. The potential across gap P2 rises until the second gap breaks down and this continues for the remaining gaps until all gas between the pins is ionized. After this sliding-spark, the discharge path avoids the 50K$\Omega$ resistors resulting in a low impedance and high current characteristic.

The simple configuration is an improvement over previously reported sliding-spark REA and MAL lasers. The main departure is the use of a four sliding-spark array of pre-ionizing pins PIP in a double sided geometry next to the top and bottom electrodes. The tungsten pins are symmetrically displaced with respect to the optical axis. Homogeneity of the ionization photons for the preconditioning of the main lasing gap and the lack of obstruction to transverse gasflow are particular improvements in this set-up. The arc arrays on each side of the electrode are fed by different capacitors which makes it easier to match the circuit parameters, producing more uniform and critically damped break down which both promotes U.V. production and avoids erosion of the P.I. pins. As indicated above, the pre-ioniser is isolated from the main discharge so the delay between these live discharges can be tuned. Delay times are between 200 nsec to 1.5 $\mu$sec to provide satisfactory plasma conditions.

The time interval between the surge currents at successive spark gap breakdowns is less than 1 nsec. For the 33 gaps this results in an overall delay of less than 33 nsec. It has been found that a delay of 75 nsec between the triggers of the P.I. and main bank is satisfactory. The optimal delay between P.I. and main discharge recommended is about 200 nsec and is in close approximation to what was found.

After the initial runs with the laser the P.I.-unit was improved by introducing capacitors in parallel with the resistors with a value of 180 pF each. Effectively the surge current is forced to charge and discharge these spark peaking capacitors, which extend the photon production.

Operation of the P.I. unit suggests the following:
(a) A double row of sparks with a 50% offset to one another gives improved uniformity compared with a single sided illumination.
(b) In order to achieve a reasonably homogeneous photon distribution to precondition the main electrode gap, a spark is required every two cm.
(c) To avoid tail off end-effects on the photonization caused by the limited pre-ioniser length, the latter must exceed the electrode length; with the 250 mm long electrodes, a 300 mm P.I. is used.
(d) The most critical parameter is the distance of the spark array from the electrode center-line and this should be minimized. The P.I. offset from the main electrodes employed was between 2 and 5 cm.

Uniformity in pre-ionisation in the directions transverse to the main discharge current flow is more essential than uniformity in the parallel direction. Space charge effects distort the local electric field and the ionization rate, but smooth the plasma non-uniformities that develop during discharge initiation and create a uniform discharge.

Although the invention has been shown and described with reference to a particular embodiment, it will, of course, be recognized by persons skilled in the art that various changes and modifications are possible within the scope of the invention, which is to be defined solely by reference to the appended claims.

I claim:

1. In a gas-discharge laser including an optical axis situated between a pair of main electrodes, said optical axis and said main electrodes being substantially parallel to each other, and wherein one of said pair of main electrodes is arranged to have a lower voltage than the other of said pair of main electrodes during operation of said laser, the improvement comprising a plurality of pre-ionizing electrode arrays arranged on two sides of said pair of main electrodes to provide ionization throughout the discharge volume between the main electrodes, said arrays including means for causing a sliding-spark discharge in said pairs of pre-ionizing electrodes, the sliding-spark progressing sequentially from a first pair to a last pair, wherein said pairs of pre-ionizing electrodes are symmetrically displaced on opposite sides of the optical axis and the main electrodes.

2. An improvement as claimed in claim 1, wherein a first electrode in each of said pairs of pre-ionizing electrodes is electrically connected with one of the main electrodes and the second electrode of each pair of electrodes is electrically connected with the other of the main electrodes.

3. An improvement as claimed in claim 2, wherein the electrical connection of each of said first electrodes with said one of the main electrodes includes a peaking capacitor.

4. An improvement as claimed in claim 2, wherein the electrical connection of each of said first electrodes with said one of the main electrodes includes a peaking capacitor, except that an electrode of the last pair is electrically connected directly to the lower voltage main electrode.

5. An improvement as claimed in claim 1, wherein the arrays are arranged to be installed in a laser discharge chamber as a unit.

6. An improvement as claimed in claim 1, wherein a plane which passes through a single electrode pair on a first lateral side of one of the main electrodes will pass half-way between two adjacent electrode pairs on the outer side of the main electrode when the plane is perpendicular to the length of the main electrode.

7. An improvement as claimed in claim 1, wherein neighboring electrode pairs are separated by a distance of approximately two centimeters.

8. An improvement as claimed in claim 1, wherein the length of each array exceeds the length of each of the main electrodes.

9. An improvement as claimed in claim 1, wherein the distance of each array from the optical axis is minimized.

* * * * *